United States Patent
Durina

(10) Patent No.: US 8,734,146 B2
(45) Date of Patent: May 27, 2014

(54) MINIATURE AUTOMATIC SHUTOFF NOZZLE TIP

(76) Inventor: Michael F Durina, Poland, OH (US)

( * ) Notice: Subject to any disclaimer, the term of this patent is extended or adjusted under 35 U.S.C. 154(b) by 0 days.

(21) Appl. No.: 12/908,675

(22) Filed: Oct. 20, 2010

(65) Prior Publication Data
US 2012/0100245 A1 Apr. 26, 2012

(51) Int. Cl.
*B29C 45/52* (2006.01)
(52) U.S. Cl.
USPC .................................. 425/562; 425/563
(58) Field of Classification Search
USPC ............................................. 425/562, 563
See application file for complete search history.

(56) References Cited

U.S. PATENT DOCUMENTS 7,527,493 B1 * 5/2009 Durina ........................ 425/562
7,824,175 B2 * 11/2010 Dominka .................... 425/562

FOREIGN PATENT DOCUMENTS

JP          61-233514       * 10/1986

OTHER PUBLICATIONS

Franklin D. Yeaple, Hydraulic and Pneumatic Power and Control Design, Performance, Application, 1966, McGraw-Hill, pp. 268-270.*

* cited by examiner

*Primary Examiner* — Tim Heitbrink
(74) *Attorney, Agent, or Firm* — Harpman & Harpman

(57) ABSTRACT

An improved automatic shutoff nozzle tip which is mounted on the downstream end of a nozzle body of an injection molding machine or the like who's purpose is to act as a passageway for molten plastic fluid allowing the fluid to flow in one direction when urged to open by the pressure created by the forward motion of the plasticizing screw of said molding machine and to close when said pressure is lower than the designed opening pressure. The nozzle, having an convex outwardly extended portion that mates up with a sprue bushing or mold having complimentary convex radii, said nozzle having a orifice on the distal end that mates with a complimentary orifice of said sprue bushing. A nozzle that has a means for attachment to a nozzle body or the like with a rear seat, poppet and spring or similar device who's poppet is normally in the closed position until pressure is applied urging the poppet to move in the downstream direction and providing for a passageway for molten plastic fluid.

1 Claim, 3 Drawing Sheets

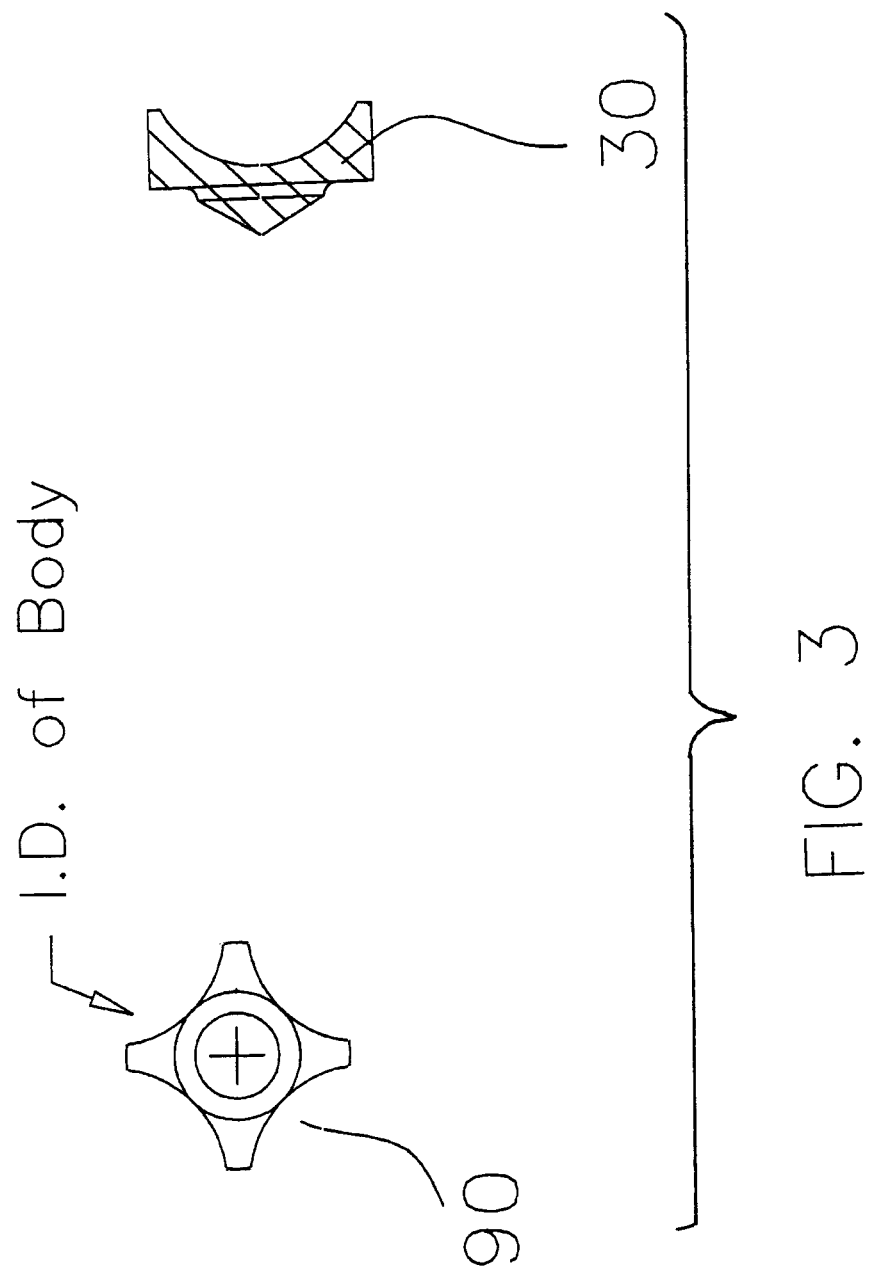

MINIATURE AUTOMATIC SHUTOFF NOZZLE TIP

BACKGROUND OF THE INVENTION

1. Technical Field

This invention relates to a reciprocating plastic extruder and more particularly this invention relates to a miniature automatic shutoff nozzle tip for controlling flow of molten plastic fluid through a discharge chamber passageway and into a mold.

2. Description of Prior Art

The manufacturing process of injection molding is a primary form of manufacturing of plastic products in the world today. The demands of high molded part tolerances, dimensional stability, and shot-to-shot repeatability are increasing and better controls and mechanical components of the injection machines are required to meet the increasing demands. A major component that contributes to this process of improvement is the plasticating unit and specifically, the nozzle which is one of the components of the unit. The nozzle can be a one piece construction design or a two piece construction design where there is a nozzle body and "replaceable nozzle tip" that has a means for attachment, which is usually a thread. The miniature automatic shutoff nozzle tip of this invention is a component of the two piece design and is referred to as a "replaceable tip". The two piece design nozzle has the advantage that it can be changed readily to match the radius, orifice and geometry of the internal passageway to match the specific resin being processed and the nozzle tip is much shorter than the one piece nozzle body and of course it is much easier to machine the internal geometry of a removable nozzle tip than it is to machine a standard length one piece nozzle. A properly designed nozzle will lead to fewer imperfections of the molded parts. Imperfect molded parts cost the industry billions of dollars per year. An improvement in the nozzle is desirable to eliminate imperfect molded parts.

SUMMARY OF THE INVENTION

Injection Molding machines of the type in which the invention pertains to generally comprises an elongated helical plasticating screw which rotates and reciprocates axially in a cylindrical bore of an elongated heated barrel for moving heated plastic material along the helical flight channels of the screw, from an inlet port to a discharge port where it is injected from a distribution chamber, through a nozzle and into a mold via a sprue bushing. The flow of the molten plastic material into the distribution chamber for subsequent discharge through the nozzle is controlled by the non-return valve.

Standard nozzle tips such as U.S. Pat. No. 6,604,933 rely on the plastic fluid to "freeze-off" at the distal end of the orifice so as to prevent drooling or stringing to occur when the mold is opened. Drooling and stringing occur because of the differential between the internal pressures of the molten plastic fluid which can be as high as 5000 psi and atmospheric pressure. If freeze-off does not occur then the molten fluid will transfer into the sprue bushing of the mold and deter the flow of the incoming fluid during the injection forward portion of the next cycle. This interference will affect the quality of the parts deeming them defective. Most standard nozzle tips do not "freeze-off" so the industry wide solution is to use a molding method called melt decompression, which reverses the motion of the screw at the end of screw rotate so as to lower the melt pressure making it somewhat equivalent to atmospheric pressure and hence no compelling reason for the fluid to flow into the mold. Another solution is to provide an automatic shutoff nozzle or needle shutoff nozzle which is shown and described in U.S. Pat. No. 7,291,008. Automatic needle shutoff nozzles of this type are more precise functionally in stopping the flow of the polymer but they are typically much longer in length, more complicated and more expensive and have a higher pressure drop than the standard nozzle tip. All Automatic needle shutoff nozzles employ a needle tip/pin that is placed in the center of a nozzle body that shuts off against a seat that is positioned at the distal end of the nozzle body and upstream of the nozzle orifice passageway. The needle that is centered in the melt stream impedes the flow of the molten plastic fluid and complicates the design. In addition, most needle valves are operated by an external force such as a spring or a pneumatic piston that is attached to an armature which extends to the needle pin through a hole in the body. The hole is sealed so as to prevent leakage of the high pressure molten fluid and the seals are subject to failure. The miniature automatic nozzle tip of this invention is an automatic shutoff device that utilizes a spring or the like component to provide the force to urge a poppet towards a seat that is held in the normally closes position and is positioned downstream of the nozzle tip opening, and opened when the force of the plastic fluid exceeds the force of the spring. The nozzle tip of this invention is miniature in size, has no external moving parts, is easily attached and removed to a nozzle body and provides a precise seal whose design is unlike any prior art.

DESCRIPTION OF THE DRAWINGS

FIG. 3 is a front elevational view and cross sectional view of the poppet of the invention.

DESCRIPTION OF THE PREFERRED EMBODIMENT

Figure 1:
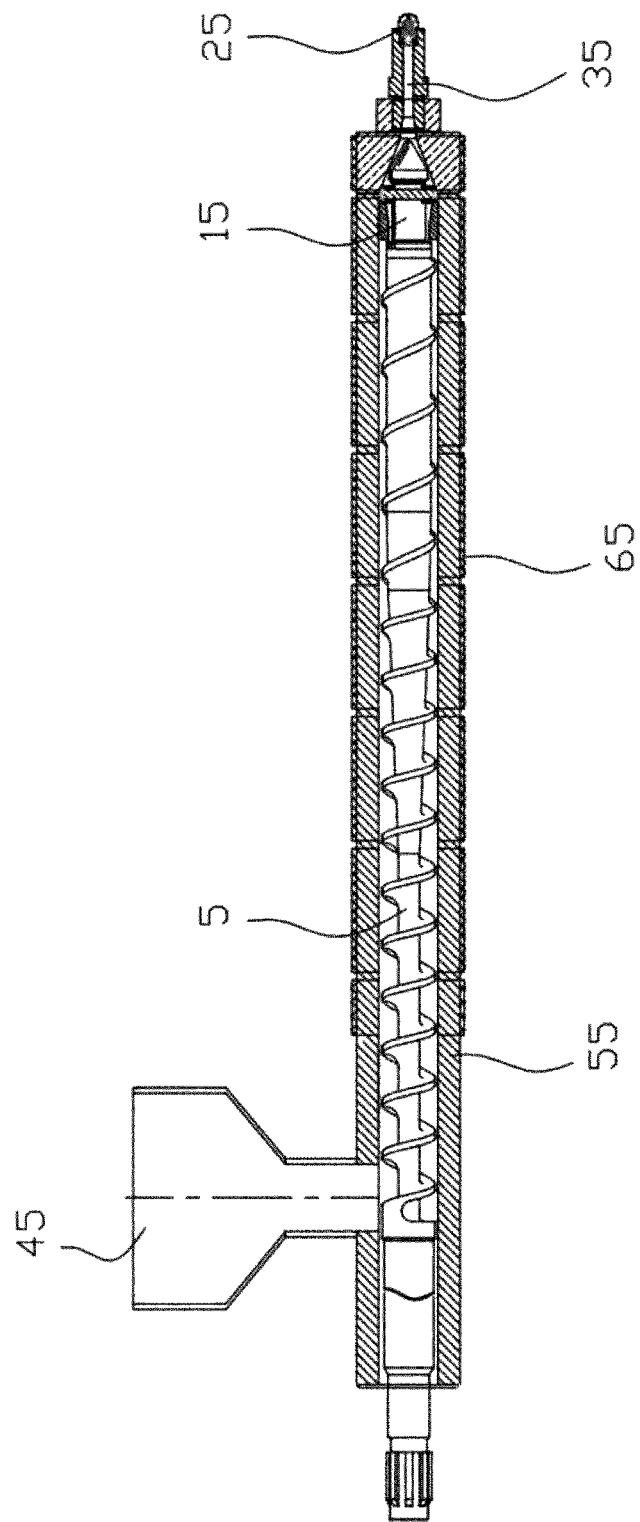
FIG. 1 is a cross sectional view of the plasticating unit of an injection molding machine.

FIG. 1 represents a cross sectional view of a plasticating unit for an injection molding machine. The plasticating unit includes a heated elongated barrel 55 enclosing a reciprocating and rotating helical screw 5 which is fed plastic pellets through a material hopper 45 filled with solid resinous material particles that are not shown and an inlet port for admission of one or more solid particulate resinous materials and any required additives or agents. The screw 5 comprises a helical flight that wraps around a core that forms a channel for conveyance of the plastic pellets from the inlet section along the axis while the apparatus is heated by heaters so that the pellets become melted during transit within barrel 55. This operation and apparatus is described more fully in U.S. Pat. No. 4,752,136.

The non-return valve 15 is located at the forward end of the rotating screw 5. The screw is shown with the non-return valve 15 in the open position which allows molten plastic fluid to flow through it so as to fill up the nozzle and barrel chamber urging the screw to move upstream. The molten plastic fluid discharges through the nozzle tip 25 passageway and into a mold that is not shown.

Figure 2:
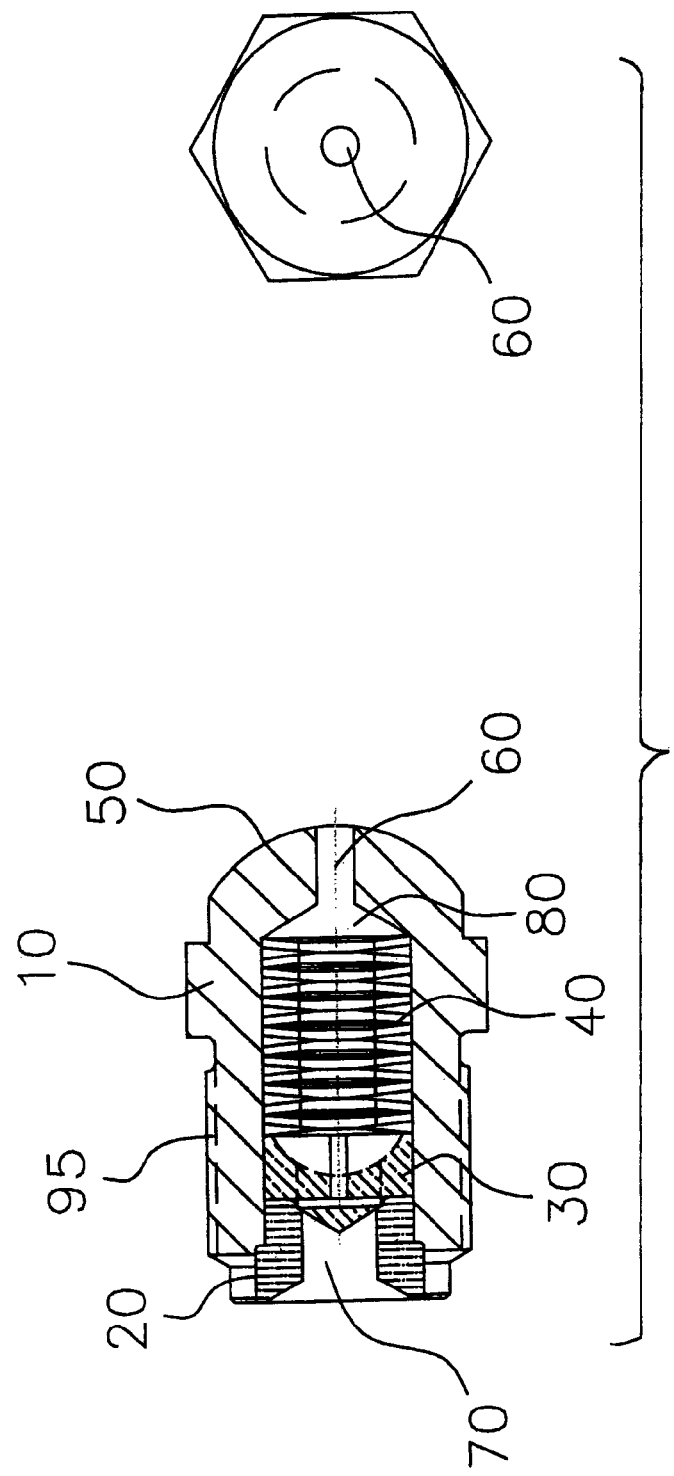
FIG. 2 is a cross sectional view and an end view of the miniature automatic nozzle tip.

The miniature automatic shutoff nozzle tip 25 of the invention shown in FIG. 2 is shown in the closes position. The nozzle body 10 houses the rear seat 20, poppet 30, and spring 40, with a rear opening passageway 70 that provides an entry for the flow of molten plastic fluid. Plastic fluid that is not shown applies pressure to the poppet 30 and spring or the like 40 urging the poppet away from the seat 20 creating an opening allowing said fluid to flow through poppet passageway 90 the inner chamber 80 and orifice 60 and into said mold.

Operation

The functioning of the injection molding machine, plasticizing unit and miniature automatic shutoff nozzle is described as such: The plastic extruder of this invention comprises a rotating helical screw 5 within a cylindrical barrel 55 of the type which is used to feed molten plastic to a high pressure injection or blow molding apparatus. The plastic extruder and injection apparatus operate sequentially. First the plastic extruder, by rotation of the helical screw 5 forces molten plastic fluid through the flight channel to the non-return valve 15 and into the cavity of the nozzle 25. Specifically, the screw 5 rotates and accepts plastic pellets that are not shown, through a feed opening hopper 45 and flight channel which conveys material forward along said flight channel that is formed along with the barrel 55. The plastic pellets while being conveyed, pick up energy from shear and the heater bands 65 becoming mostly molten and fluid, and is pumped through a non-return valve 15 into a nozzle distribution chamber 35, and proceeds to displace volume and reciprocate rearward (if the nozzle tip 25 is either "frozen off" or shut off with an automatic shutoff nozzle), to a predetermined set point where said screw rotation stops. The empty mold is filled when the screw 5 is moved forward, and a seal is created by said non-return valve 15 that displaces the molten plastic fluid through the nozzle rear opening passageway 70 of the invention, develops enough pressure against the poppet 30 urging it to move downstream and create an opening for said fluid to flow through the opened passageway 90 between the poppet 30 and inside diameter of the body 10, through the center of the spring chamber 80, orifice 60 and into said mold. When the injection forward phase of the molding cycle is near complete, the hydraulic pressure differential across the poppet 30 will diminish such that said poppet will close due to the force applied by the spring 40 and form a seal with the seat 20.

Our device employs a seat 20, a poppet 30, a spring or the like 40 and a body 10, whereas said spring forces said poppet against said seat so as to form a seal preventing molten plastic fluid to flow until a set pressure is exceeded that urges said poppet downstream creating an opening for fluid to flow between said seat 70 and poppet 30, through the poppet passageway 90, center passageway 80 and orifice 60. Said miniature automatic shutoff nozzle is much smaller in size compared to prior art, is user friendly, easy to install and remove, has a center flow passageway for low pressure drop and is useable with most resin groups. Therefore

I claim:

1. A miniature automatic shut-off nozzle tip for an injection molding machine that acts as a selective checked valve,
    said injection molding machine comprises, an elongated helical plasticizing screw within a heated barrel,
    a non-return valve in communication with said screw,
    a nozzle distribution chamber and a nozzle tip downstream from said non-return valve,
    said miniature automatic shut-off nozzle tip comprises,
    a nozzle body,
    a passageway chamber in said nozzle body,
    a rear valve seat in said passageway chamber, having an upstream opening in communication with said nozzle distribution chamber, and a downstream sealing surface for registration with a poppit valve element in said normally closed position,
    said poppit valve element centered along the axis of said nozzle body passageway chamber and said rear valve seat and aligned in select sealing registration therewith,
    said poppit valve element having an exterior diameter surface adjacent the inside diameter surface of said passageway chamber, and a central valve seat element engagement surface of a diameter less than that of said inside interior diameter of said passageway chamber defining a fluid flow passageway when said poppit valve element is in open position,
    a spring in said passageway chamber registering with said poppit valve element movable from a first spring-urged normally closed position against said rear valve seat to a second open position under upstream fluid material flow pressure, an injection orifice in said nozzle body in communication with said passageway chamber downstream of said poppit valve element, said spring in said passageway chamber comprising a plurality of apertured spring elements defining a fluid material passageway therethrough.

* * * * *